United States Patent
Koester et al.

[19]

[11] Patent Number: 5,902,007
[45] Date of Patent: May 11, 1999

[54] MOTOR VEHICLE DOOR ENTRY AREA

[75] Inventors: Karl Koester, Nagold; Frank Marx, Ebhausen; Lars Matthies, Hamburg, all of Germany

[73] Assignee: Daimler-Benz Aktiengesellschaft, Stuttgart, Germany

[21] Appl. No.: 08/925,722

[22] Filed: Sep. 9, 1997

[30] Foreign Application Priority Data

Sep. 9, 1996 [DE] Germany .......................... 196 36 505

[51] Int. Cl.⁶ .................................................. B60R 16/02
[52] U.S. Cl. ........................... 296/209; 296/208; 296/199
[58] Field of Search .................................... 296/199, 208, 296/209, 29, 39.1

[56] References Cited

U.S. PATENT DOCUMENTS 3,634,991  1/1972  Barton, Jr. et al. .
4,355,842  10/1982  Kira .

FOREIGN PATENT DOCUMENTS

| | | | |
|---|---|---|---|
| 693866 | 9/1964 | Canada | ................................. 296/208 |
| 36 06 812 A1 | 9/1987 | Germany . | |
| 37 29 050 A1 | 3/1989 | Germany . | |
| 39 38 431 A1 | 5/1991 | Germany . | |
| 41 04 968 A1 | 9/1992 | Germany . | |
| 42 30 636 A1 | 3/1994 | Germany . | |
| 195 30 262 A1 | 2/1996 | Germany . | |
| 60-234040 | 11/1985 | Japan | ...................................... 296/199 |

*Primary Examiner*—D. Glenn Dayoan
*Assistant Examiner*—Jason Morrow
*Attorney, Agent, or Firm*—Evenson, McKeown Edwards & Lenahan, P.L.L.C.

[57] ABSTRACT

Door entry area for a motor vehicle has a cover for a cable duct and a door entry rail joined by metal clamps with a sill flange lengthwise member. The cover for the cable duct has a strip-shaped projection that overlaps the sill flange by force and in a sealing fashion, and the door entry rail is designed as a T-section that has a central retaining member and two shaped legs that project approximately horizontally in the assembled state, with the retaining rib being lockable by means of a latching connection accessible for disassembly in a receiving groove of the cover that abuts the projection and runs along the sill flange.

6 Claims, 1 Drawing Sheet

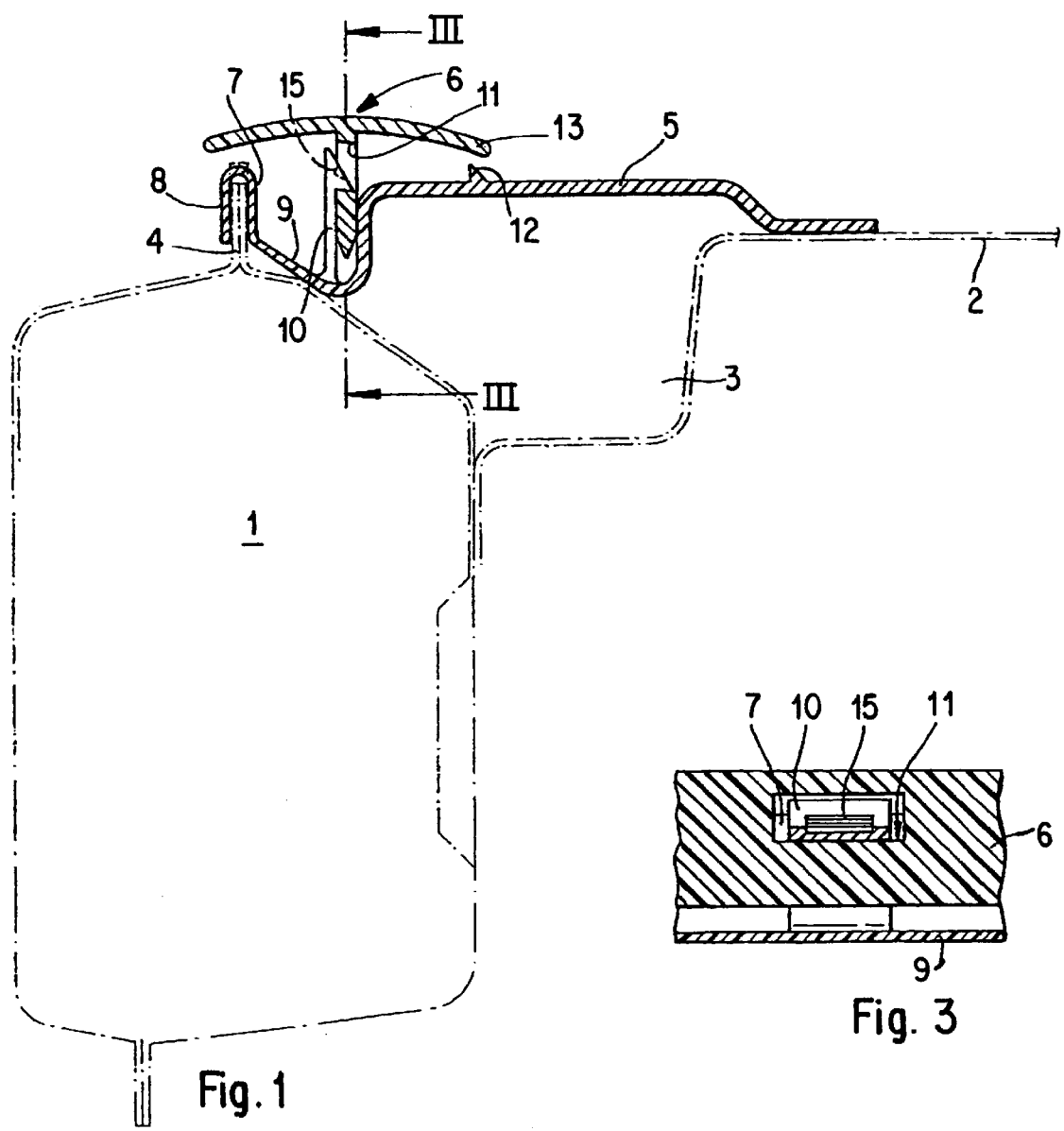
Fig. 1
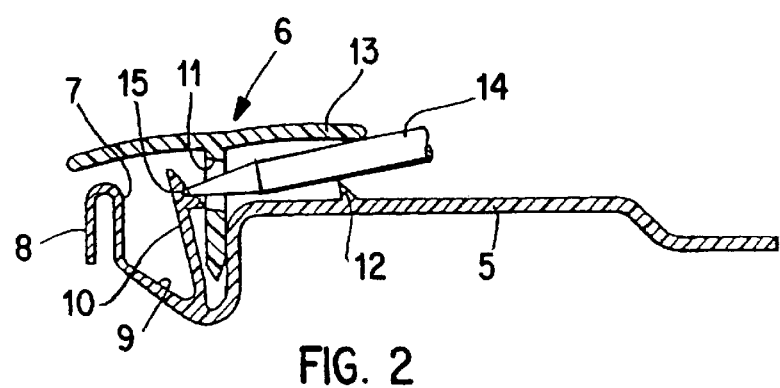
Fig. 3
Fig. 2

MOTOR VEHICLE DOOR ENTRY AREA

BACKGROUND AND SUMMARY OF THE INVENTION

This application claims the priority of German application 196 36 505.8, the disclosure of which is expressly incorporated by reference herein.

The present invention relates to a door entry area for a motor vehicle, such as an automobile, and more particularly to a cover which is attached to a sill flange of the body abutting a cable duct where it faces the vehicle interior, as well as with a door entry rail located at least approximately at the level of the sill flange.

In Mercedes-Benz automobiles, metal clamps have been applied in the door entry area to the body sill flanges which serve for spot welding of an outer shell of the sill and an inner shell of the sill. Thereby, a door entry rail and a cover for a cable duct that abuts the interior of the sill are clamped by force. Additional mounting elements are necessary to mount the entry rail and the cover for the cable duct.

DE 42 30 636 A1 shows door entry areas at the front side doors in which a space is provided for laying a battery cable, the space adjoining a sill flange of the respective door sill. The cable duct itself faces the interior of the vehicle and abuts the battery cable space or chamber. The battery cable chamber and the cable duct are covered by a broad entry strip that also covers the sill flange. Separate provision of a cover for the cable duct and a door entry rail has not previously been recognized.

An object of the present invention is to provide a door entry area for a motor vehicle to ensure simple installation and removal of the cover and the door entry rail.

This object has been achieved by providing that the cover for the cable duct has a strip-shaped projection which fits over the sill flange by force and with a sealing action. The door entry rail is configured as a T-section with a central retaining rib and two section legs projecting approximately horizontally in the assembled state. The retaining rib is lockable with a latching connection which is accessible for removal once again in a receiving groove of the cover abutting the projection and running along the sill flange.

The solution according to the invention achieves simple installation and removal without additional mounting elements. The widening of the cover for the cable duct by the projection and the overlapping of the sill flange by force and with a sealing effect by the projection reliably prevents water from penetrating the cable duct. The latching connection creates a stable mount for the door entry rail on the cover for the cable duct.

In another embodiment of the present invention, the latching connection in the receiving groove is achieved by a plurality of latching hooks, distributed in the lengthwise direction of the receiving groove and projecting upward. The central retaining rib of the door entry rail is provided with a corresponding number of appropriately positioned latching positions whose length in each case is greater than the width of the latching hook. The greater length of the latching positions compensates for tolerances between the latching positions and the latching hooks in the lengthwise direction of the receiving groove and hence also in the lengthwise direction of the sill flange. The one-piece molding of latching hooks on the cover and the likewise one-piece shaping of latching positions in the door entry rail obviates the need for additional mounting elements. In addition, the projection for fitting over the sill flange is preferably provided with suitably shaped tabs made in one piece which, possibly combined with notches or depressions in the sill flange, guarantee the mounting of the cover on the sill flange.

In another embodiment of the invention, the latching positions are made in the form of openings in the central retaining rib, and at least the T-leg of the door entry rail which projects toward the vehicle interior is elastically flexible so that a tool can be inserted to release the latching connection between the T-leg and the cover surface. The latching connection is now locatable in a completely covered position below the T-leg of the door entry rail and nevertheless permits simple disassembly.

In another embodiment of the invention, the head of each latching hook is provided with tool engagement surfaces for pushing out the latching hooks from the corresponding latching positions. In another embodiment, the tool-engaging surfaces are notches, whereby, e.g. a screwdriver, can be used without slipping by engaging the notches.

In another embodiment of the invention, a corresponding number of positioning projections is provided at the same axial height with respect to the latching hooks, with the projections projecting from the surface of the cover. These positioning projections are located below the inner T-leg of the door entry rail to be visible from outside. As a result, despite the covered arrangement of the latching connection, the position of the respective latching hooks can be easily determined. By placing a screwdriver at the level of the positioning projections and then pressing the screwdriver inward, the screwdriver automatically engages the notches in the latching hooks, making it possible to push the latching hooks out of the openings easily.

BRIEF DESCRIPTION OF THE DRAWINGS

Other objects, advantages and novel features of the present invention will become apparent from the following detailed description of the invention when considered in conjunction with the accompanying drawings wherein:

FIG. 1 is a cross-sectional view through one embodiment of a door entry area according to the present invention;

FIG. 2 is a cross-sectional view showing disassembly of the latching connection between the door entry rail and the cover for a cable duct of the door entry area of FIG. 1; and FIG. 3 is a cross-sectional view through the latching connection between the door entry rail and the cover for the cable duct along line III—III in FIG. 1.

DETAILED DESCRIPTION OF THE DRAWINGS

At each side door of an automobile, a lengthwise member 1 is provided in a known manner. The member 1 is part of a body support structure of the automobile. Each lengthwise member 1 has an outer shell and an inner shell facing the middle of the vehicle, the shells being connected with one another by spot welding at an upper sill flange 4 which runs in the lengthwise direction of the vehicle and at a lower sill flange. A vehicle floor 2 faces the middle of the vehicle and abuts the inner shell of lengthwise member 1.

Immediately adjacent to the inner shell of lengthwise member 1, the vehicle floor 2 is suitably bent at an angle to form a cable duct 3 which can be closed by a plastic cover 5. Cover 5 is in the form of a plate or shell and faces the middle of the vehicle, with a portion fitting flush against vehicle floor 2. Cover 5 has a receiving groove 9 which faces the exterior of the vehicle and is externally adjoined transversely to the lengthwise direction of the vehicle by a projection 7 which forcingly engages sill flange 4 in a sealing manner with the aid of shaped tabs 8, thereby preventing the entry of water.

In the illustrated embodiment, projection 7 is mounted with its tabs 8 by friction alone on sill flange 4. Tabs 8 are each pushed into recesses in the upper end edge of sill flange 4 for axial locking of cover 5 in the lengthwise direction of sill flange 4. Alternatively, the present invention also contemplates providing the tabs 8 also with latching noses which engage matching notches in sill flange 4 for an additional form fit.

A plurality of spaced latching hooks 10 project upward from the bottom of receiving groove 9 of cover 5, in the lengthwise direction of receiving groove 9 and hence in the lengthwise direction of sill flange 4. The hooks 10 are molded integrally in receiving groove 9. Latching hooks 10 are elastically flexible, as seen in FIG. 2, and are arranged transversely to the lengthwise direction of the vehicle at a distance from the adjacent vertical wall of cover 5. Thereby, a plastic retaining rib of a door entry rail 6 can be pushed into the gap thus formed with a slight clamping fit (FIGS. 1 and 2).

The retaining rib has a part of a T-shaped plastic section which projects vertically downward and represents door entry rail 6. Door entry rail 6 has two T-legs 13, with an outer T-leg being pulled outward with a light downward curvature to the point where it covers sill flange 4 and projection 7. The inner T-leg 13 which points toward the middle of the vehicle has the same length as the outer T-leg and extends up to the level of a positioning projection 12, corresponding to the outer T-leg, with a slight downward curvature and a slight inward curvature as well. Both T-legs and especially inner T-leg 13 are elastically flexible.

The retaining rib has latching positions 11 configured as openings which are positioned at the same height as latching hooks 10 and whose number matches the number of latching hooks 10. The length of each latching position 11 is greater than the width of each latching hook 10 as seen in FIG. 3 so that tolerances in the lengthwise direction of the lengthwise sill 1 between door entry rail 6 and cover 5 are compensated for.

Each opening 11 has an upper and a lower edge which are inclined downward diagonally from the exterior to the interior. Likewise, each latching hook 10 has on its head correspondingly configured latching noses, wherein each of the noses in the assembled state fits beneath the lower edge of the respective opening 11 along two coordinate axes. One lower edge of the retaining rib is made wedge-shaped in order to facilitate the insertion of the retaining rib and hence of door entry rail 6 into the gap between latching hook 10 and the vertical wall of cover 5.

A notch 15 is provided on the run-on bevel of each latching nose of each latching hook 10 and serves for engagement of a screwdriver 14 or the like as seen in FIG. 2. Because each latching hook 10 engages from the exterior of the vehicle into the respective opening 11, releasing each latching hook 10 by inserting a screwdriver 14 from the interior of the vehicle is achieved. Inner T-leg 13 covers openings 11 and latching hook 10 so that the positions of openings 11 and latching hooks 15 cannot be seen from the interior of the vehicle. Hence, a plurality of positioning projections 12 is provided at the level of the end edge of T-leg 13, projects integrally upward from the surface of cover 5. These positioning projections 12 are each located at the same height as the associated latching hooks 10, viewed in the lengthwise direction of lengthwise sill 1, so that it is possible to see from the outside where the respective latching connections are located.

By inserting screwdriver 14, in each case at the location of the corresponding positioning projection 12 and bending inner T-leg 13 elastically upward, latching hook 10 is pushed out of the corresponding latching position 11 and door entry rail 6 can be pulled upward. For reassembly of door entry rail 6, no tools are required because door entry rail 6 with its retaining rib need only be pushed into the gap of receiving groove 9 between latching hook 10 and the vertical wall of cover 5 until the latching hooks engage the corresponding latching openings 11.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Door entry area for a motor vehicle, comprising a cover mountable on a body sill flange to abut a cable duct which adjoins the sill flange and faces an interior portion of the vehicle, and a door entry rail located at least approximately at the level of the sill flange, wherein the cover for cable duct has a strip-shaped projection configured to forcingly and sealingly fit over the sill flange, and the door entry rail has a T-shaped section with a central retaining rib and two shaped legs projecting approximately horizontally in an assembled state, the retaining rib being lockable by a latching connection which is accessible for disassembly in a receiving groove of the cover abutting the projection and extending along the sill flange.

2. The door entry area according to claim 1, wherein a plurality of latching hooks are operatively associated with said cover for providing a latching connection in receiving groove, said hooks being distributed in the lengthwise direction of said receiving groove and projecting upwardly therefrom, and the central retaining rib of door entry rail is provided with a matching number of correspondingly positioned latching positions having a length greater than the width of an associated latching hook.

3. The door entry area according to claim 2, wherein the latching positions are configured as openings in said central retaining rib, and at least one leg of said T-shaped sectional projects toward the vehicle interior and is elastically flexible such that a tool for releasing latching connection can be inserted between the at least one leg and a surface of said cover.

4. The door entry area according to claim 3, wherein the head of each latching hook is provided with at least one tool engagement surface for pushing latching hooks out of corresponding latching positions.

5. The door entry area according to claim 4, wherein the at least one tool engagement surface is a notch.

6. The door entry area according to claim 2, wherein a corresponding number of positioning projections is provided at a same axial height as said latching hooks, said projections being configured to project from the surface of said cover.

* * * * *